United States Patent [19]

Allard et al.

[11] Patent Number: 4,730,924

[45] Date of Patent: Mar. 15, 1988

[54] LENS METER AND METHOD OF MEASUREMENT OF PROGRESSIVE MULTIFOCAL LENS USING THE SAME

[75] Inventors: Henri Allard, Quebec; Robert Drummond, Ontario; Charles P. Villeneuve, Quebec, all of Canada; Yukio Ikezawa, Tokyo, Japan

[73] Assignee: Tokyo, Kogaku, Kikai, Kabushiki, Kaisha, Tokyo, Japan

[21] Appl. No.: 835,055

[22] Filed: Feb. 28, 1986

[30] Foreign Application Priority Data

Mar. 2, 1985 [JP] Japan ................................. 60-41714

[51] Int. Cl.[4] .............................................. G01B 9/00
[52] U.S. Cl. ........................................ 356/125; 356/129
[58] Field of Search ............................... 356/124–127; 51/216 LP

[56] References Cited

U.S. PATENT DOCUMENTS 3,492,075  1/1970  Davis .............................. 51/216 LP
3,618,271  11/1971  Martiros .............................. 356/124
4,330,203  5/1982  Oppenheim et al. .............. 356/120

Primary Examiner—R. A. Rosenberger
Assistant Examiner—Crystal D. Cooper
Attorney, Agent, or Firm—Brumbaugh, Graves Donohue & Raymond

[57] ABSTRACT

Lens meter and method of measurement of progressive multifocal lens using the same which is able to set the amount of movement of the lens and to simply position a far- or near-distance refraction characteristics-measuring portion of a progressive multifocal lens. In accordance with the method the optical center of a lens is first found from measurement employing the lens and using the optical center as point of origin, the lens is moved by a distance up to the far-distance refraction characteristics measuring portion and the near-distance refraction characteristics measuring portion of the lens mentioned by the lens manufacturer, so as to effect alignment with the measurement optical axis of the lens meter, thereby measuring the refraction characteristics of each measuring portion.

14 Claims, 35 Drawing Figures

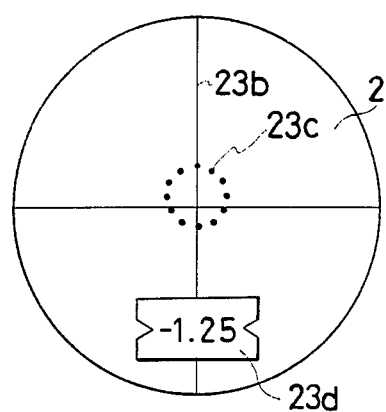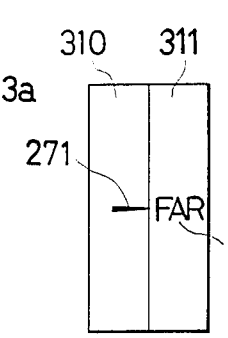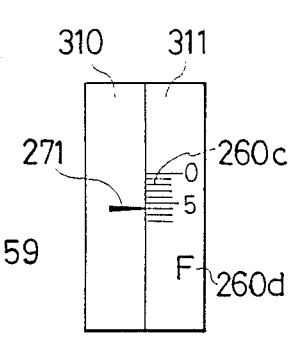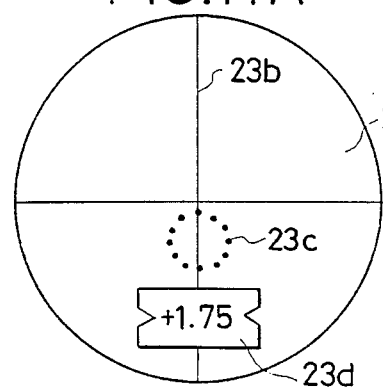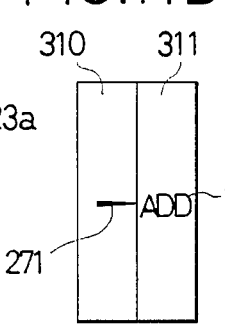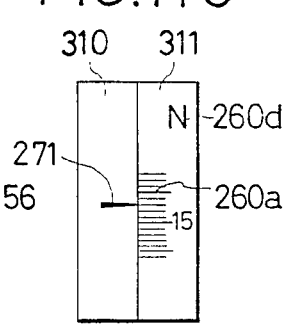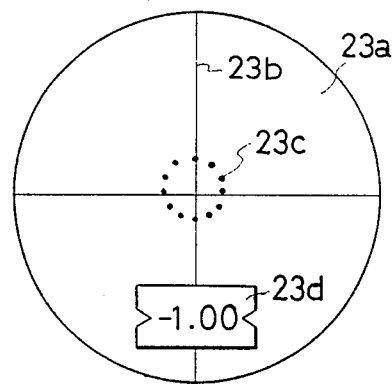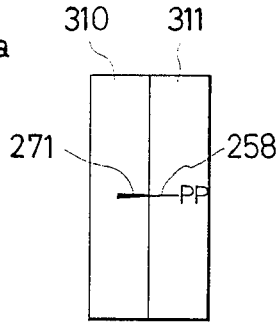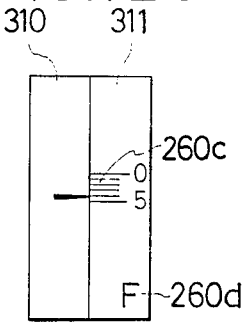

LENS METER AND METHOD OF MEASUREMENT OF PROGRESSIVE MULTIFOCAL LENS USING THE SAME

BACKGROUND OF THE INVENTION

Field of the Invention

The present invention relates to improvements of a lens meter which is capable of readily measuring the refraction characteristics of the progressive multifocal lens by means of the lens meter.

Recently, there has been a growing demand for progressive multifocal lenses having no boundary which are used for correction of the early-stage prebyopia of the middle aged and the elderly. Since this progressive multifocal lens is constructed such that a portion for the far distance, a portion for the near distance, and a progressive belt portion connecting the two portions are formed continuously on a nonspherical surface, it is impossible to identify a far-distance refraction characteristics measuring portion and a short-distance refraction characteristics measuring portion by observing its appearance only, as with a conventional bifocal lens. The term "refraction characteristics" referred to here is employed as a general term meaning the degree of spherical surface, the degree of cylinder, the angle of cylindrical axis, and the degree of prism. For this reason, to facilitate measurement of refraction characteristics and working of lenses at the time of fitting lenses in eyeglass frames at eyeglasses stores, lens manufacturers provide various marks, as shown in FIG. 1, on uncut lenses before they are fitted in the eyeglass frames, which are supplied to eyeglasses stores. FIG. 1 shows one example of such marks, in which reference numeral 10 denotes a horizontal reference line; 11, a diamond mark; 15, a mark indicating the geometrical center and optical center; 12, a fitting point; 13, a mark indicating a far-distance refraction characteristis-measuring portion; 16; a mark indicating near-distance refraction characteristics; 14, a mark indicating the degree of the near distance; and 17, a manufacturer's mark. At the time of measuring the far-distance refraction characteristics of this lens, the lens is set in such a manner that the measurement optical axis of the lens meter is located in the circle of the mark 13, and the mark 13 will coincide with the center of the lens holder of the lens meter. On the other hand, at the time of measuring the near-distance refraction characteristics, the lens is set in such a manner that the circle of the mark 16 coincides with the lens holder. In addition, if it is desirous to know the refraction characteristics at a fitting point, as necessary, the lens is set in such a manner that a point of intersection 12a of the mark 12 coincides with the center of the lens holder.

A conventional lens meter for progressive multifocal lenses having the aforementioned arrangement has had the following drawbacks and inconveniences at the time of measuring their refraction characteristics.

(1) In a lens after its periphery is ground and fitted in the lens frame, of the various marks described with reference to FIG. 1, all the marks, excluding the diamond mark 11, the mark of additional degree of the near distance 14, and the manufacturer's mark 17, are erased. As a result, when an attempt is made to later measure the refraction characteristics of the lens fitted in its frame, it is utterly impossible to discern from its appearance alone at which positions the far-distance or near-distance refraction characteristics should be measured. In consequence, it is necessary to find specified measuring positions while viewing through the lens meter on a trial-and-error basis.

(2) As a measure against the problem described in (1) above, lens manufacturers employ check cards. Specifically, a method is adopted whereby a card illustrating various marks shown in FIG. 1 is prepared, and, by matching the diamond mark on the check card with the diamond mark 11 left on the lens fitted in the frame, relevant marks are written on the mark with a marker pen or the like with reference to the mark indicating a far- or near-distance refraction characteristics measuring portion provided on the check card, and measurement is effected.

However, these check cards are not necessarily stored in every eyeglass store, and the work per se has been very complicated.

(3) Furthermore, in order to know the name of the manufacturer of the framed lens, the manufacturer's mark 17 may be checked. In addition, to position the lens with the check card, the diamond mark 11 may be checked, and if it is desirous to know the additional degree of the near distance alone, the indicator mark 14 may be searched on the lens, respectively. However, since these marks are very small and are indicated vaguely, the retrieval per se is extremely difficult in the present situation.

DESCRIPTION OF THE INVENTION

Objects of the Invention

It is an object of the present invention to provide an extremely simple method of measuring the refraction characteristics of a presently commercially available progressive multifocal lens by the use of a conventional lens meter.

Another object of the present invention is to provide a novel useful lens meter having a means of setting the amount of movement of the lens which is capable of simply positioning a far- or near-distance refraction characteristics-measuring portion of a progressive multifocal lens.

SUMMARY OF THE INVENTION

According to the present invention, the above and other objects can be accomplished by a method to first find the optical center of a lens to be examined from measurement employing a lens meter, and using the optical center as a point of origin, the lens to be examined is moved by a distance up to the far-distance refraction characteristics measuring portion and the near-distance refraction characteristics measuring portion of the lens mentioned by the lens manufacturer, so as to effect alignment with the measurement optical axis of the lens meter, thereby measuring the refraction characteristics of each measuring portion.

According to another aspect of the present invention, the above and other objects can also be accomplished by a method for measurement of a progressive multifocal lens provided with prism thinning work. First, a position at which the degree of spherical surface and the degree of cylinder become minimum is sought while measuring the far-distance refraction characteristics, and that position is set as a far-distance refraction characteristics measuring portion. Using that measuring portion as a point of origin, the lens to be examined is moved by a distance of the far-distance refraction characteristics measuring portion up to the near-distance refraction characteristics measuring portion announced by the manufacturer. Then, the near-distance measuring portion is located on the measurement optical axis of the lens meter, thereby measuring the near-distance refraction characteristics.

In a preferable aspect of the present invention, there is provided a lens meter having a lens mounting means for mounting the progressive multifocal lens fitted into an eyeglasses frame, a measuring means for measuring the refraction characteristics of the lens to be examined; a lens table having a table surface for abutting the lens frame of the eyeglasses frame and for restricting the vertical position of the lens to be examined within a plane substantially vertical to the optical axis of the measuring means, and a lens table moving means for moving the lens table in such a manner as to change an interval between the table surface and the optical axis, characterized in that the lens meter has a lens vertical movement amount setting means for setting an amount of the vertical movement of the lens to be examined, and the lens vertical movement amount setting means is arranged such that its point of origin can be changed independently from the movement of the lens table.

The above and other objects and features of the present invention will become apparent from the following descriptions of preferred embodiments with reference to the accompanying drawings.

BRIEF DESCRIPTION OF THE DRAWINGS

FIGS. 9A, 9B, 9C, 10A 10B, 10C, 11A, 11B, 11C, and 12A, 12B and 12C are diagrams explaining the operation of the second embodiment and a method of measurement based thereon;

DESCRIPTION OF THE PREFERRED EMBODIMENTS

First Embodiment

Arrangement

Figure 3:
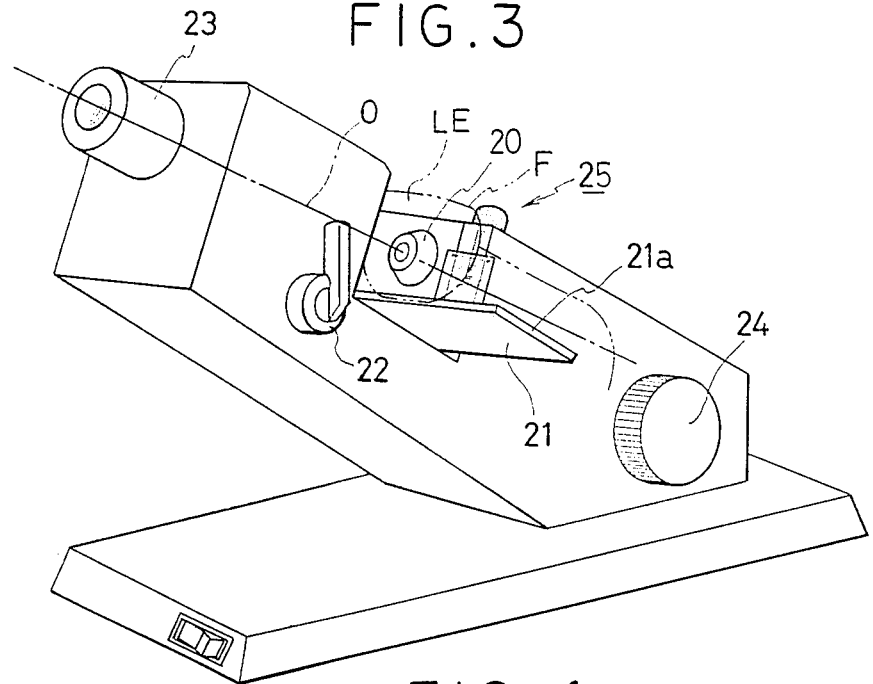
FIG. 3 is an external perspective view of a first embodiment of a lens meter according to the present invention.

FIG. 3 is a perspective view illustrating the external view of a lens meter based on a first embodiment of the present invention. This lens meter has a lens holder 20 for mounting a progressive multifocal lens LE to be examined which has been fitted in an eyeglass frame F, as well as a lens table 21 on which the frame is mounted. As for the lens table 21, its height (the interval between a measurement optical axis O and a table surface 21a) can be altered by means of a lever 22, and its vertical position on the lens LE to be examined can be altered within a plane substantially perpendicular to the measurement optical axis O. Its transverse position can be altered by horizontally moving the frame F on the table surface 21a of the lens table 21.

The amount of movement of this lens LE to be examined is set by a lens movement setting device 25, which will be described later. A measurer views through an eyepiece 23, rotates a measurement knob 24 until a target image is focused sharply on a reticle (not shown), and can measure the refraction characteristics of the lens from a diopter scale indicated within an ocular field. Since an optical system for measuring refraction characteristics per se of this embodiment has the same arrangement as that of a known telescopic-type lens meter, a description thereof will be omitted.

Figure 4:
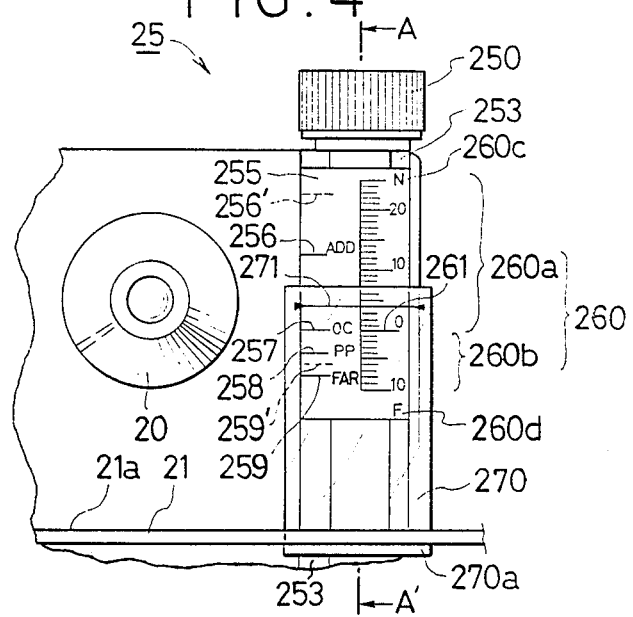
FIG. 4 is a front elevational view of the lens movement amount indicating device of the first embodiment.
Figure 5:
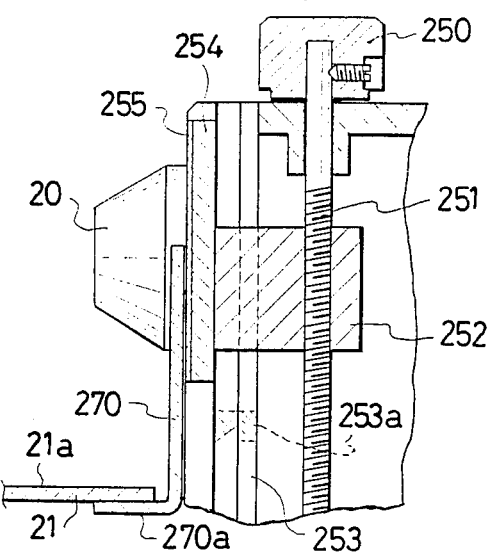
FIG. 5 is a cross-sectional view taken along the line A-A' of FIG. 4.

FIGS. 4 and 5 are fragmentary enlarged views illustrating the arrangement of the lens movement setting device 25. This lens movement setting device 25 is constituted by the following: a feed screw 251 having a knob 250; a movement block 252 which moves vertically by the rotation of the feed screw 251; a guide rail 253 having a dovetail structure, as shown by a cross sectiion 253a, and adapted to guide the vertical movement of the movement block 252; a base plate secured to the movement block 252; an indicator plate 255 adhered on the base plate 254; and an index plate 270 installed on the lens table 21.

Figure 1:
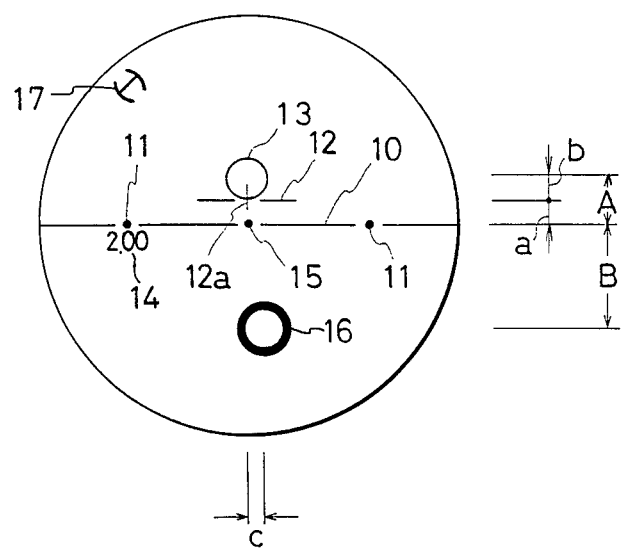
FIG. 1 is an explanatory diagram illustrating one example of the positional relationship among each measuring portion of a progressive multifocal lens.

The indicator plate 255 is provided with the following: an optical center indicator 257 constituted by an indicator line and an "OC" indicator showing the position of an optical center or a geographic center; a fitting position indicator 258 constituted by an indicator line and a "PP" indicator removed from the indicator 257 by a distance equal to a distance a from the optical center 15 of the lens to a fitting point 12, illustrated in FIG. 1; a far-distance measuring portion indicator 259 constituted by an indicator line and a "FAR" indicator removed from the indicator 257 by a distance equal to a distance A from the optical center 15 of the lens to the mark indicating the measurement of near-distance refraction characteristics, shown in FIG. 1; and a near-distance measuring indicator 256 constituted by an indicator line and an "ADD" indicator removed from the indicator 257 by a distance equal to a distance B from the optical center 15 to the mark 16 indicating the measurement of near-distance refraction characteristics, shown in FIG. 1.

The nose-side distance C between these distances A, B, and A and the mark 16 indicating a portion of measurement of near-distance refraction characteristics, on the one hand, and the mark 15 indicating the optical center, on the other, vary according to the lens manufacturer. Accordingly, in this embodiment, indicators 256 to 259 are provided in correspondence with the numerals for the respective distances of the lens having the largest market share. To further increase the user's convenience in using this lens meter, a second indicator line 259 for indicating a far-distance-measuring portion and a second indicator line 256' for indicating a near-distance measuring portion are provided with colors different from those of the indicator lines 256 and 259 in correspondence with the numerals of distances of the second-ranking lens (for instance, 256 and 259 in black and 256' and 259' in green).

Furthermore, to ensure that this lens meter can be used for measurement of any commercially available lens, the indicator plate 255 is provided with a scale 260 in parallel with the arrangement of the indicator lines, 256, 256' to 258, 258'. With respect to the scale 260, its "0" position 261 is made identical as the position of the optical center indicator 257, and a near-distance scale 260a is indicated in the upper side thereof, and a far-distance scale 260b is indicated on the lower side thereof each in a different color (for instance the far-distance scale in black, and the near-distance scale in red). In addition, the near-distance scale is provided with an "N" mark 260c indicator its purport, while the far-distance scale is provided with an "F" mark 260d indicating its purport.

On the underside of the lens table 21 is secured the bent portion 270a of a transparent plastic index plate 270 having an L-shaped cross section, which is constructed such that the upright portion of the plate 270 faces the indicator plate 255. This index plate 270 is provided with an index line 271.

Operation and Measuring Method

Figure 6A:
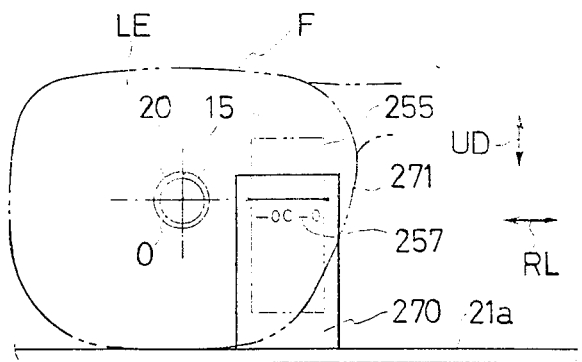
FIGS. 6A, 6B, 6C and 6D are schematic diagrams explaining the operation of the first embodiment and a method of measurement based thereon.
Figure 6B:
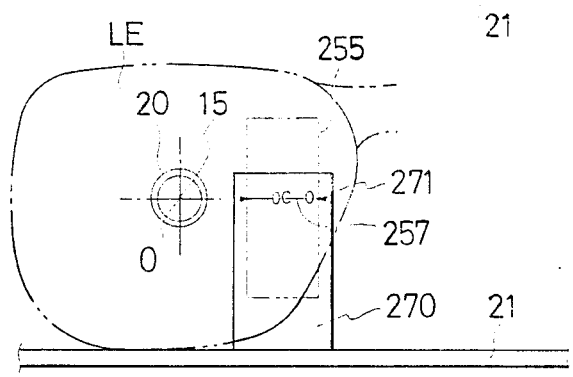
Figure 6C:
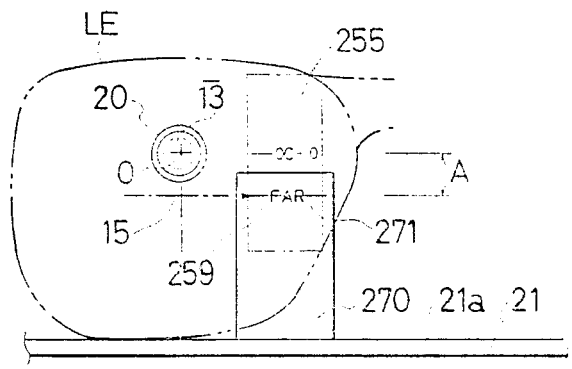

Referring next to FIGS. 6A to 6D, the operation of the above-described first embodiment and a method of measuring the amount of lens movement employing the same will now be described. (First Step):

As shown in FIG. 6A, by aligning the lens to be examined by the use of a known lens meter, i.e., by making the optical center of the lens agree with the measurement optical axis of the lens meter, the measurer brings the optical center 15 of the lens LE to be examined into alignment with the measurement optical axis 15 of the lens meter. At this time, the lower end of the lens frame F is made to constantly abut the table surface 21a of the lens table 21. The vertical movement (in the direction of an arrow UD) of the lens LE is adjusted by the vertical movement of the lens table 21 by means of a lever 22. In addition, the transverse movement (in the direction of an arrow RL) of the lens LE is effected by moving the frame F itself on the table surface 21a with the fingers. (Second Step):

As shown in FIG. 6B, the feed screw 251 is rotated by rotating the knob 250 so as to move the movement block 252 and bring the indicating line of the optical center indicator 257 on the indicator plate 255 into alignment with the index line 271 on the index plate 270. (Third Step):

Next, as shown in FIG. 6C, the lens table 21 is lowered by rotating the lever 22 so as to move the lens LE downwardly. At this time, it goes without saying that attention must be paid so that the frame F will now be removed from the table surface 21a. Then, the lens is lowered until the indicator line of the far-distance measuring portion indicator 259 of the indicator plate 255 aligns with index line 271 of the index plate 270.

Figure 6D:
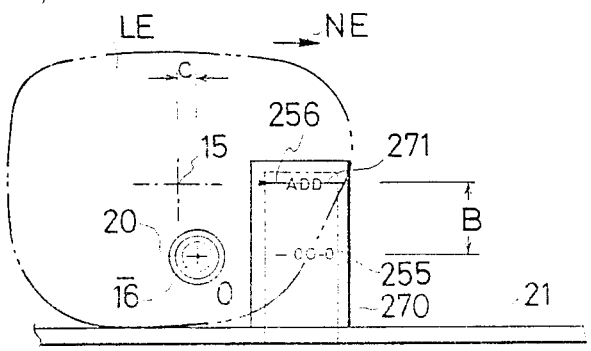

Consequently, since the optical center 15 of the lens LE is lowered by the distance A, it becomes possible to bring the far-distance refraction characteristics-measuring portion 13 of the lens LE into alignment with the measurement optical axis O of the lens meter. In this state, the refraction characteristics of the lens are measured by the same method as that for a known lens meter, and the value obtained is set as the degree of the far distance. (Fourth Step):

As shown in FIG. 6D, the lens table 21 is raised by rotating the lever 22, and the lens LE is raised in such a manner that the index line 271 of the index plate 270 will be aligned with the near-distance measuring portion indicator 256 on the indicator plate 255. Thus, the distance B, i.e., the vertical distance B from the optical center 15 to the near-distance refraction characteristics measuring portion $\overline{16}$, is set. Next, the frame F is moved on the table 21a of the lens table toward the nose side (in the direction of an arrow NE) by a distance of 2–3 mm corresponding to the nose-side distance C.

Thus, the near-distance refraction characteristics measuring portion $\overline{16}$ and the optical axis O of the lens meter can be aligned. To ensure the accuracy of the amount of movement toward the nose side, the measurer can adjust the amount of movement accurately from the relative positional relationship between the target image within the ocular field and the reticle marked +. In this way, the degree of the near distance is measured for the near-distance refraction characteristics measuring portion $\overline{16}$, and the additional degree of the near distance can be obtained from a difference between the same and the aforementioned degree for the far distance.

The above-described first to fourth steps are the cases of a method whereby the indicators 256 to 259 are used, i.e., a case where the lens LE to be examined is the lens of the No. 1 market share. However, if the lens of No. 2 market share is used for the lens to be examined, the indicators 256', 259' may be used instead of the indicators 256, 258.

Furthermore, if the lens to be examined is one of a small market share, the lens table may be moved by employing the scale 260 and adjusting the lens to the distances A, B indicated by the meter.

Since the nose-side distance C has a small difference in its set value in comparison with the distances A, B, among manufacturers, the near-distance refraction characteristics measuring portion can always be virtually aligned with the optical axis merely by moving the lens by a substantially identical amount.

Furthermore, when it is desirous to measure the refraction characteristics of the lens at a fitting point, measurement may be effected at a position to which the lens is moved in such a way that the index line 271 is aligned with the fitting position indicator 258 after lowering the lens table 21.

Second Embodiment

Arrangement

Figure 7:
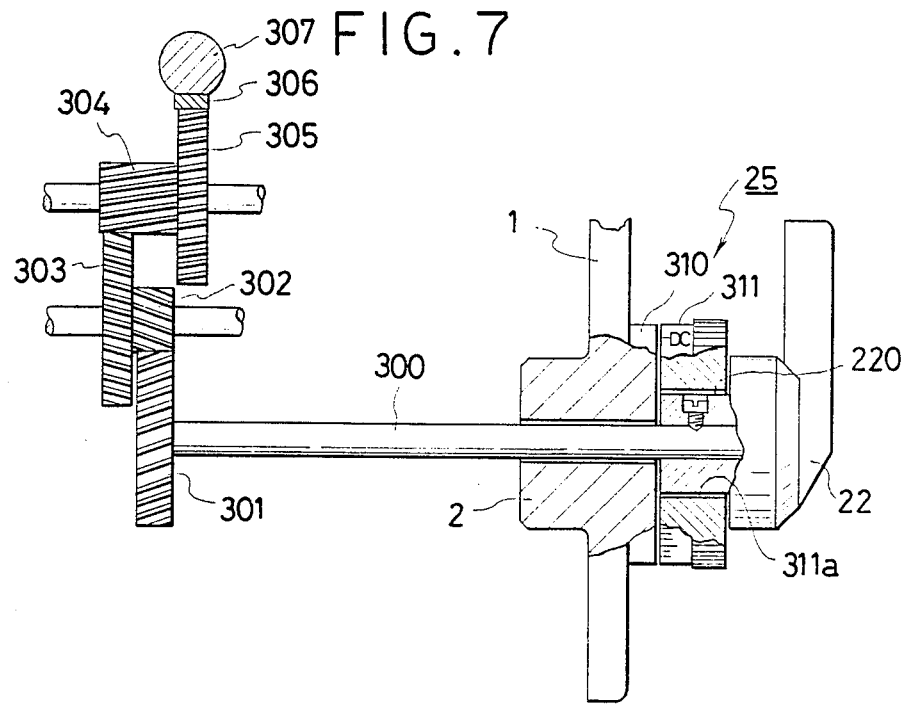
FIG. 7 is a partially cutaway view illustrating the lens movement amount indicating device of a second embodiment of the present invention.
Figure 8A:
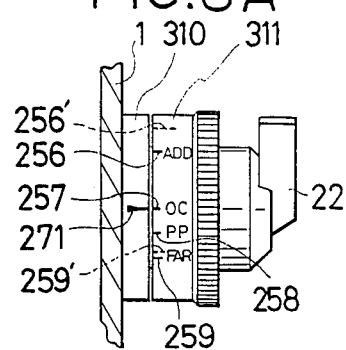
FIGS. 8A, 8B and 8C are explanatory diagrams illustrating the forms of the indicating of the scale on the ring of the second embodiment.
Figure 8B:
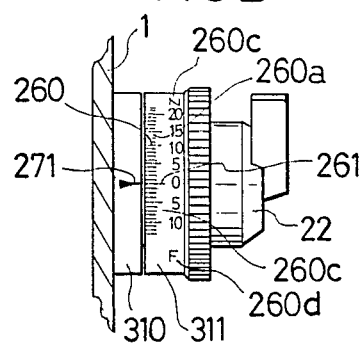
Figure 8C:
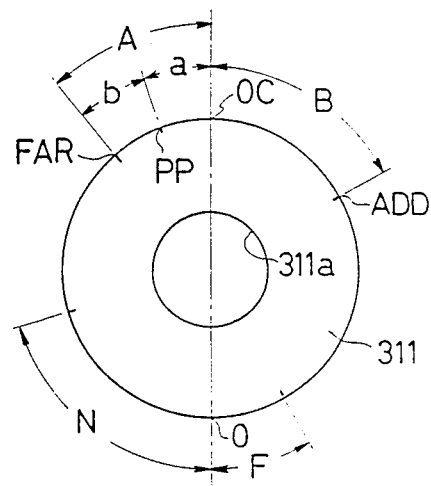

FIGS. 7 and 8 illustrate a second embodiment of the present invention, in which the same numerals are provided for those constituent elements which are the same as or equivalent to those in the above-described first embodiment, and explanation thereof will be omitted.

This embodiment is an example in which the lens table movement amount-setting device 25 is provided to the lever for vertically moving the lens table. In other words, the lever 22 is fixed to one end of a shaft 300 which is pivotally supported by a bearing 2 formed in the casing 1 of the lens meter. A gear 301 is provided to the other end of the shaft 300, and the rotation of the gear 301 is transmitted to a pinion 305 via a gear train 302, 303, and 304. The pinion 305 is engaged with the rack 306 of a shaft 307 to which the lens table 21 is installed, and the rotation is converted to linear vertical movement so as to move the lens table 21 vertically.

The inner shaft surface 220 of the lever 22 is rotatably supported with a predetermined frictional force on the inner peripheral surface 311a of the ring 311 being applied thereto. The predetermined frictional force referred to here means an amount of frictional force which will now rotate the lever 22 when the ring 311 is rotated by gripping the same, but which is necessary to rotate integrally with the lever 22 when the lever 22 is rotated. In addition, an index cylinder 310 is formed on the casing 1 in parallel with the ring 311, and the index line 271 is provided on the external surface thereof. The external peripheral surface of the ring 311 is provided with the indicators 256 to 259 at cyclical intervals and the opposite external peripheral surface is provided with the scale 260, as shown in FIG. 8B.

Operation and Measuring Method

Figures 9B, 9C:
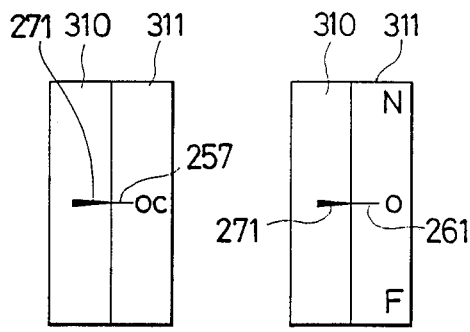
Figure 9A:
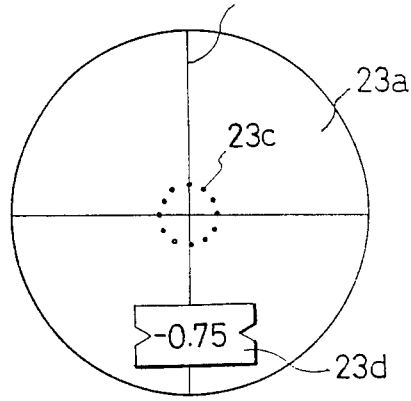

Referring next to FIGS. 9 to 12, description will be made of the operation of the above-described second embodiment and a method of measuring the refraction characteristics of the lens to be examined employing the same. FIGS. 9A, 10A, 11A, and 12A illustrate fields of observation through the eyepiece 23. (First Step):

The lever 22 and the frame F are moved as in the case of the aforementioned first step of the first embodiment in such a manner that the point of intersection of the + marked reticle of the ocular field 23a and the center of the target image 23c will agree with each other. (Second Step):

After confirming the agreement between the target image 23c and the + marked reticle 23b, the ring 311 is rotated so that the indicator 257 thereof and the index line 271 will be aligned, as shown in FIG. 9B. In a case where the lens LE to be examined is a lens of a small market share, i.e., when it is necessary to use the scale 260, the 0 position indicator 261 is aligned with the index line 271, as shown in FIG. 9C.

At this time, since the ring 311 is slidably rotated on the inner shaft surface 220 of the lever 22, the lever 22 is not rotated. Accordingly, no movement of the lens table, and, hence, the lens to be examined occurs. (Third Step):

The lever 22 is rotated, and the far-distance measuring portion indicator 259 provided on the ring 311, which is rotated integrally by means of the frictional force occurring between the inner shaft surface 220 and the inner peripheral surface 311a of the ring 311, is aligned with the index line 271, as shown in FIG. 10B.

In consequence, the lens LE to be examined is lowered together with the lens table 21, and the far-distance refraction characteristics-measuring portion 13 is aligned with the optical axis O of the lens meter. In a case where the scale 260 is used, if the value of the distance A announced by the manufacturer of the lens to be examined is, for instance, 6 mm, the lever 22 is rotated until the index line 271 and the division 6 of the scale 260c will agree with each other. After thus moving the lens to be examined, the measuring knob 24 is rotated, the target image 23c is formed sharply on the reticle, as shown in FIG. 10A, and the degree for the far distance at that time is read through an indicator window 23d. (Fourth Step):

Then, the near-distance measuring portion indicator 256 provided on the ring 311 is made to agree with the index line 271 by rotating the lever 22, as shown in FIG. 11B. In a case where the scale 260 is to be used, the near-distance scale 260a is used, and if the distance B of the lens to be examined is, for instance, 18 mm, a division 18 and the index line 271 are made to agree with each other, as shown in FIG. 11C. Then, the lens is moved toward the nose side on the table surface 21a by 2-3 mm to such a position that the target image 23c will agree with the vertical line of the + marked reticle 23b, as shown in FIG. 11A. The measuring knob 24 is rotated at this position to make the target image sharply formed, and the degree for the near distance at that time is read through the indicator window 23d. From the value −1.25 D read in the third step and the value +1.75 D read in this step, the additional degree for the near distance can be calculated as [+1.75−(−1.25)]=3.00 D.

When it is necessary to measure the refraction characteristics at the fitting point in addition to the foregoing steps of measurement, the fitting position indicator 258 of the ring 311 is made to be aligned with the index line 271 by rotating the lever 22, as shown in FIG. 12B. In a case where the scale 260 is to be used, if the distance a is, for instance 4 mm, the index line 271 is made to agree with the division 4 of the scale 260c. In this position of movement, the target image 23e is made sharp by rotating the measuring knob, and the degree at that time may be read through the indicator window 23d.

Third Embodiment

Arrangement

Figure 13:
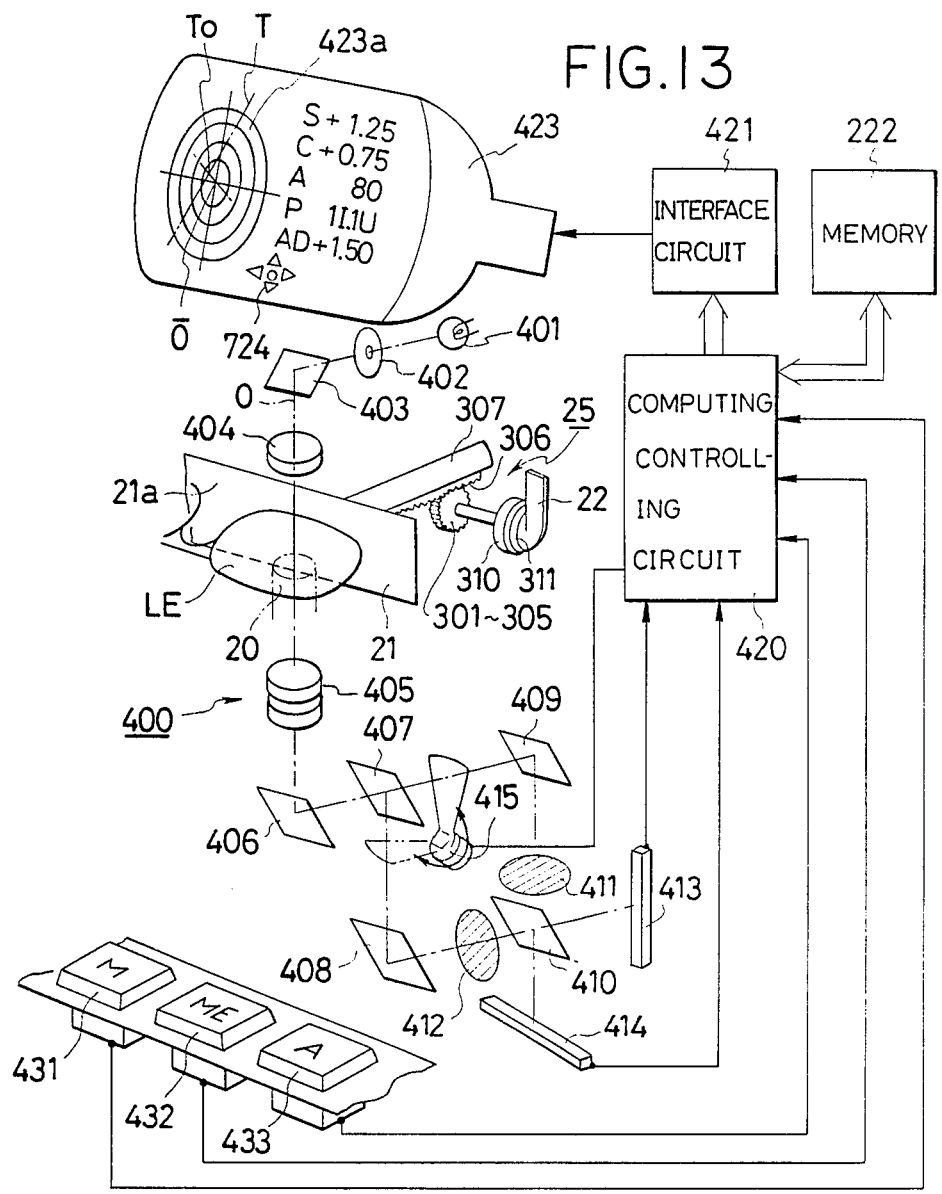
FIG. 13 is a diagram of an optical arrangement illustrating the lens meter of a third embodiment of the present invention.
Figure 14A:
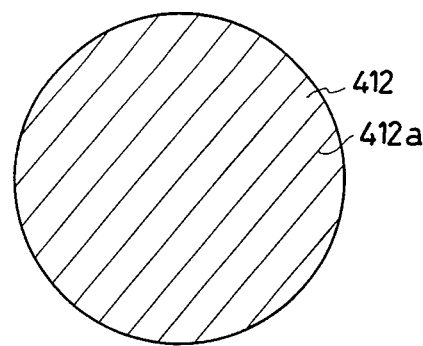
FIGS. 14A to 14B are top plan views of the mask of the third embodiment.
Figure 14B:
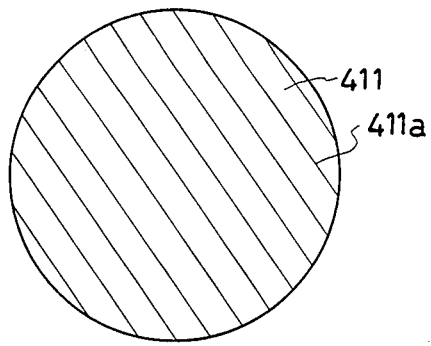
Figure 15:
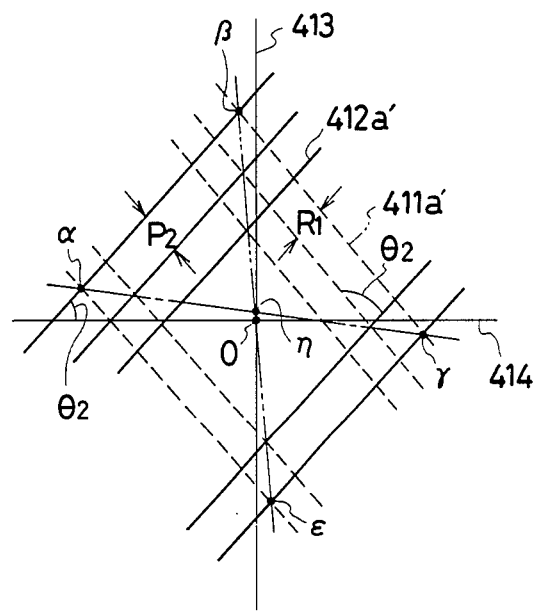
FIG. 15 is a schematic diagram illustrating the basic principle of measurement according to the third embodiment.

The above-described first and second embodiments are cases where the lens table movement mechanism of a conventionally known telescopic lens meter is improved. However, the present invention is not to be restricted to this type of lens meter alone, and may be employed in a so-called auto lens meter. FIGS. 13 to 15 show an example of the auto lens meter. This auto lens meter has the same arrangement as that of one which is commercially available as Topcon CL-1000 made by Tokyo Kogaku Kikai Co., Ltd., and as for the basic principle of measurement and the details of the arrangement thereof, refer to Japanese Patent Laid-Open No. 299933/1982.

A luminous flux from the light source 401 of the measurement optical system 400 of this lens meter is made into a point light source by means of an aperture 402. The luminous flux from the aperture 402 is made into a parallel lumnous flux by means of a cullimator lens 404 via a mirror 403, and is made incident upon the lens LE to be examined held by the lens holder 20 and the lens table 21. After being transmitted though the lens LE being examined, the luminous flux is reflected by the mirror 406, and is then divided into a first optical path constituted by a half mirror 407 and a mirror 409 and a second optical path constituted by a half mirror 407 and a mirror 408. The first and second optical paths are provided with masks 411, 412 having a multiplicity of parallel linear slits 411a, 412a, as shown in FIGS. 14A and 14B, respectively. In addition, a shutter 415 for changing over the first and second optical paths is also provided. The luminous flux selected by the mask 411 in the first optical path is divided into two by the half mirror 410, each being detected by line sensors 413, 414 constituted by a CCD, respectively. On the other hand, the luminous flux selected and transmitted by the mask 412 in the second optical path is similarly divided into two by the half mirror 410, each being detected by the line sensors 413, 414.

The line sensors 413, 414 constitute a system of orthogonal coordinates, as shown in FIG. 15. A computing and controlling circuit 420 computes the refraction characteristics of the lens being examined from the pitches $P_1$, $P_2$ and angles of inclination $O_1$, $O_2$ of the projected pattern 411a' of the mask 411 and the projected pattern 412a' of the mask 412, and the measured value is digitally displayed on a CRT display 423 via an interface circuit 421, and is temporarily stored in a memory 422.

In addition, as shown in FIG. 15, the refraction of a prism is calculated from the amount of discrepancy between the center of a quadrilateral obtained from the projected patterns 411a', 412a' and an origin 0 (coaxial with the measurement optical axis), and that amount of discrepancy is illustrated on the CRT display 423 in the form of a figure. On the basis of this displayed FIG. 423a, the alignment of the lens LE is carried out.

A marking mode switch 431 for commanding the start of measurement, a memory mode switch 432 for transmitting the measured value to the memory and storing it therein, and an ADD mode switch 433 for commanding the calculation of the additional degree for the near distance are connected to the computing and controlling circuit 420, respectively.

In this embodiment, the lens movement amount setting device 25m, which has been described in detail in the second embodiment, is incorporated into this auto lens meter.

Operation and Measuring Method

Referring next to a flowchart shown in FIG. 16A, description of the operation of this third embodiment and a method of setting the lens to be examined and a method of measurement based thereon will be given hereinunder.

Step 101:
The marking mode switch 431 is turned ON.
Step 102:
The computing and controlling circuit 420 measures an amount of discrepancy between the optical axis of the lens being examined and the optical axis O of the measurement optical system 400 (an amount of discrepancy with O in FIG. 15).
Step 103:
The amount of discrepancy between the measurement optical axis O and the optical center 15 of the lens being examined is displayed on the CRT display 423 in the form of the displayed figure 423a. The point $\overline{O}$ of intersection of the cross of the displayed FIG. 423a shows the measurement optical axis, while the point To of the cross target figure T shows the position of the optical center of the lens being examined.

Step 104:
The measurer checks whether the point To of intersection in the target figure and the point $\overline{O}$ of the cross agree with each other, i.e., whether optical center of the lens being examined and the measurement optical axis agree with each other. If they agree, the operation proceeds to Step 107, and, if they do not, to Step 105.

Step 105:
The measurer moves the lens being examined which is placed in the frame F while viewing the displayed FIG. 423a on the CRT display, so that the point $\overline{O}$ of intersection and the point To of intersection will be aligned. At this time, the vertical movement of the lens being examined is effected by rotating the lever 22 of the lens movement amount setting device 25 and by vertically moving the lens table in a state in which the lower end of the frame F abuts the table surface of the table 21. The transverse movement of the lens being examined is effected by transversely moving the frame itself on the table surface 21.

Step 106:
After confirming that the point $\overline{O}$ of intersection and the point To of intersection are aligned in the displayed FIG. 423a on the CRT display 423, the ring 311 of the setting device 25 is gripped and rotated, so that optical center indicator 257 (OC) provided on the external peripheral surface thereof will be aligned with the index line 271. If the scale 260 is to be used, the 0 position indicator 261 of the ring and the index line 271 are made to agree with each other.

Step 107:
The lever 22 is rotated, and the far-distance-measuring portion indicator 259 (FAR) of the ring 311, which rotates integrally therewith, is made to agree with the index line 271. If the scale 260 is to be used, the division of the far-distance scale 260c is adjusted to the value of the distance A announced by the manufacturer. Consequently, the far-distance refraction characteristics-measuring portion of the lens being examined is aligned with the measurement optical axis.

Step 108:
The computing and controlling circuit 420 computes the far-distance refraction characteristics on the basis of the data supplied from the line sensors 413, 414, and delivers the results to the CRT display 423 via the interface circuit 421.

Step 109:
The CRT display 423 digitally displays the measured results, i.e., the degree of spherical surface S, the degree of cylinder C, the angle of cylindrical axis A, and the amount of prism P, respectively.

Step 110:
Turn ON the memory mode switch 432. The computing and controlling circuit 432 instructs the interface circuit 421 to hold the value measured in Step 108 which is on the display 423, and causes the memory circuit 422 to store the measured value.

Step 111:
Turn ON the ADD mode switch 433. The computing and controlling circuit 432 operates to instruct a value, in which the degree of spherical surface calculated in the previous Step 109 is subtracted from a subsequent measured result of the degree of spherical surface, to be displayed on the "ADD" indicator on the CRT display 423.

Step 112:

Rotate the leve 22, and make the near-distance-measuring portion indicator 256 of the ring 311 rotating therewith agree with the index line 271. If the scale 260 is to be used, make the numerical value of the distance B stated by the manufacturer agree with the index line 271 by the use of a division of the near-distance scale 260d. In consequence, the lens being examined is moved along a vertical line connecting the optical center and the far-distance refraction characteristics-measuring portion by a distance (A+B) from the position in Step 108.

Step 113:

The measurer moves the frame F on the table surface 21a toward the nose side thereof while holding the frame F.

Step 114:

The computing and controlling circuit 420 subtracts the numerical value of the degree of the spherical surface of the far-distance measuring portion in Step 108 from the refraction characteristics, particularly the degree of surface, emerging on every occasion when the lens being examined is moved toward the nose side in Step 113, and the computing and controlling circuit 420 consecutively outputs the results as the additional degree of the near distance.

Step 115:

The output of the additional degree of the near distance from Step 114 is consecutively digitally displayed on the "ADD" indicator on the CRT display 423 via the interface 421.

Step 116:

While observing the change in the additional degree of the near distance on the "ADD" display section on the CRT display, the measurer moves the lens being examined on the table surface toward the nose side until that additional degree becomes maximum.

Step 117:

When the additional degree of the near distance has become maximum, the near-distance refraction characteristics measuring portion of the lens being examined agrees with the measurement optical axis. The measurer turns ON the memory mode switch 432 and gives instructions to the computing and controlling circuit 420 so as to hold the additional degree of the near distance being displayed in the "ADD" display portion on the CRT display 423 and to make the memory 422 store that value.

Figure 16A:
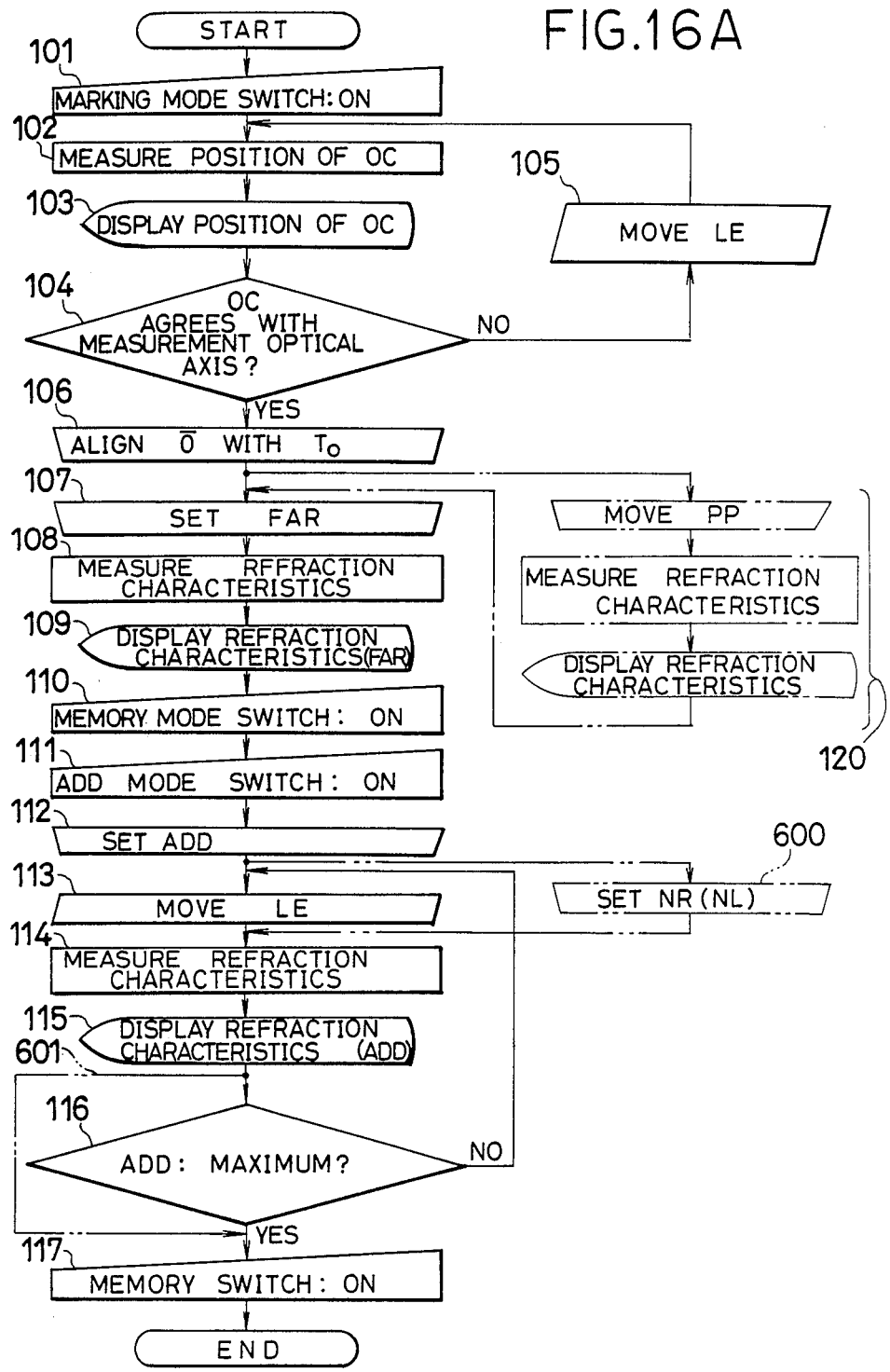
FIGS. 16A and 16B are flowcharts illustrating a method of measurement according to the third embodiment.

In the above-described steps of measurement, if it is desirous to measure the refraction characteristics at the fitting point of the lens LE to be examined, the refraction characteristics may be measured at a position where the lens LE being examined is moved by rotating the lever 22 until the fitting position indicator 258 (PP) on the ring 311 of the movement amount setting device 25 after Step 106, as in the case of Step 120 as shown by a long and two short dashes line in FIG. 16A.

Figure 2:
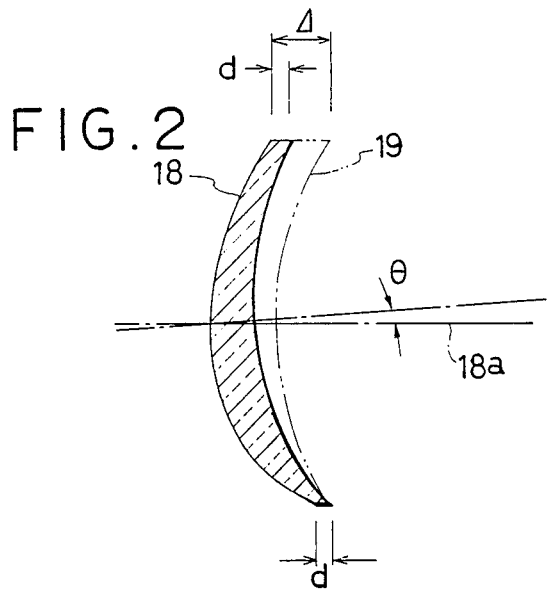
FIG. 2 is a diagram explaining prism thinning work.

In recent years, prism thinning work has come to be provided to progressive multifocal lenses, as shown in FIG. 2. In other words, if the rear-side refractive surface 19 (having a spherical or toric surface structure) is worked concentrically with the optical axis 18a of the progressively refractive surface 18 of the lens, the thickness Δ of the far-distance side becomes thick and results in a heavier lens. As a measure against this, prism thinning work is provided so that, by inclining the rear-side refractive surface 19, the thickness of the far-distance side and the thickness of the near-distance side will become an equal thickness d. If this prism thinning work is provided, the optical axis 19a of the rear-side refractive surface 19 comes to have a structure in which it is inclined by a $\theta$ vis-a-vis the optical axis 18a of the progressively refractive surface.

This inclination $\theta$ of the optical axis becomes equivalent to the lens coming to have a prism, and if the amount of thinning work is large, a phenomenon occurs in which the optical center comes to be located outside the lens, so that it becomes impossible to employ the method of measurement described in the flowchart of FIG. 16A.

Figure 16B:
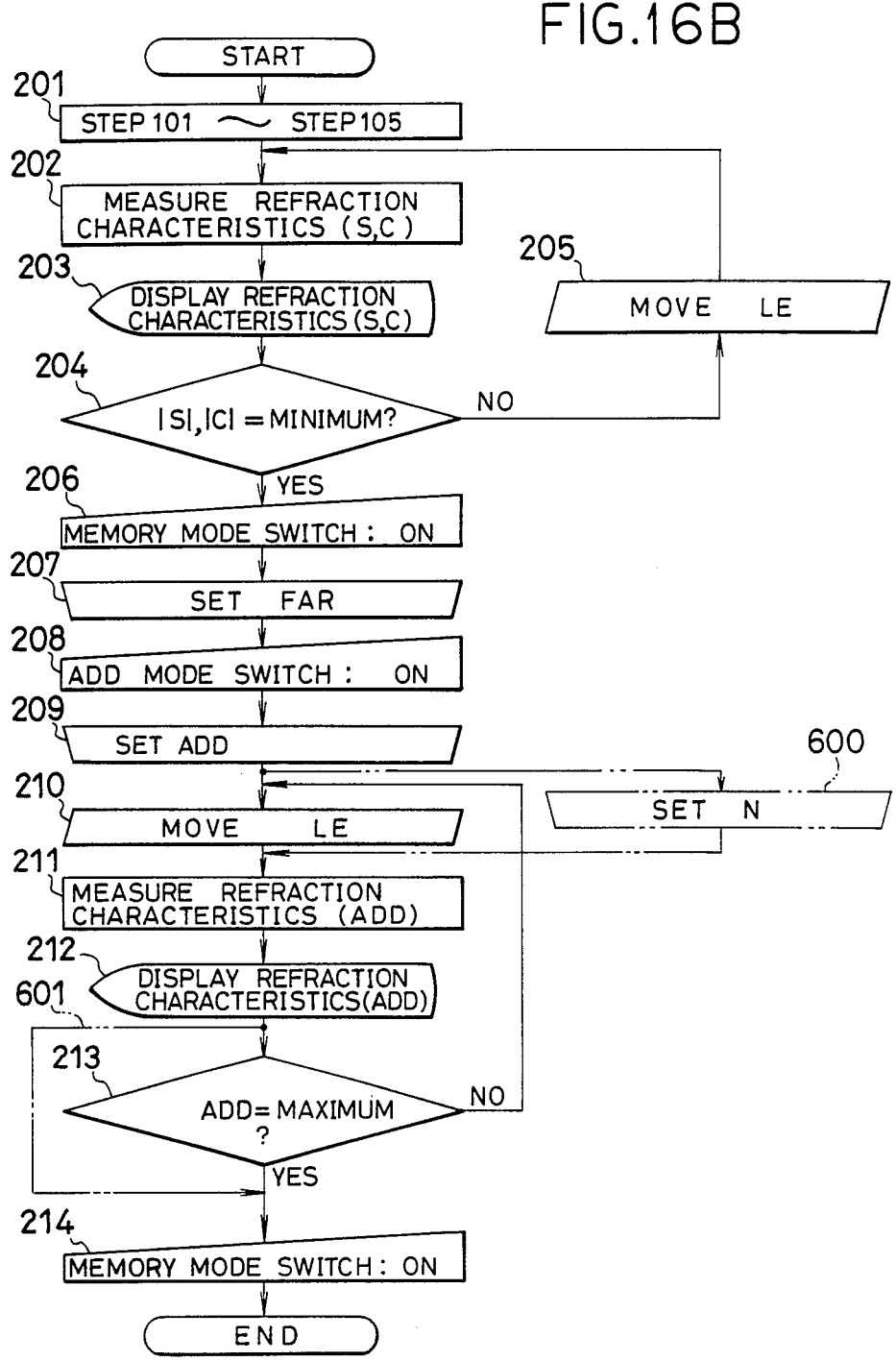

The below-described flowchart shown in FIG. 16B is one which shows a method of measuring a lens provided with this prism thinning work.

Step 201:

Execute the aforementioned Steps 101 to 104. However, the point To of intersection may be situated on the vertical line of the reticle on the displayed FIG. 423a. In other words, it suffices if the amounnt of prism in the vertical direction becomes zero.

Steps 202 to 205:

The measurer moves the lens being examined while viewing the measured values digitally displayed on a "S" section (indicating the degree of opposite faces) on the CRT display 423 and a "C" display section (indicating the degree of cylinder) thereon, and stops the movement of the lens being examined at a position where the degree of spherical surface and the degree of cylinder become minimum. This position is set as the far-distance refraction characteristics measuring portion of the lens.

Step 206:

Turn ON the memory mode switch 432 to hold the display on the CRT display and to supply the measured value to the memory circuit so as to store the measured value.

Step 207:

Rotate the ring 311 of the movement amount setting device 25, and make the numerical value of the distance A stated by the manufacturer of the lens being examined agree with the index line 271 by the use of a division of the far-distance scale 260a of the scale 260 provided on the ring 311.

Step 208:

Same as the above-described Step 111.

Step 209:

Rotate the lever 22 to make the numerical value of the distance B stated by the manufacturer of the lens being examined agree with the index line 271 by the use of a division of the near-distance scale 260c provided on the ring rotating integrally with the lever 22. By the rotation of this lever 22, the lens being examined is moved via the lens table.

Steps 210 to 214:

Same as the aforementioned Steps 113 to 117, respectively.

Fourth Embodiment

Arrangement

Figure 17:
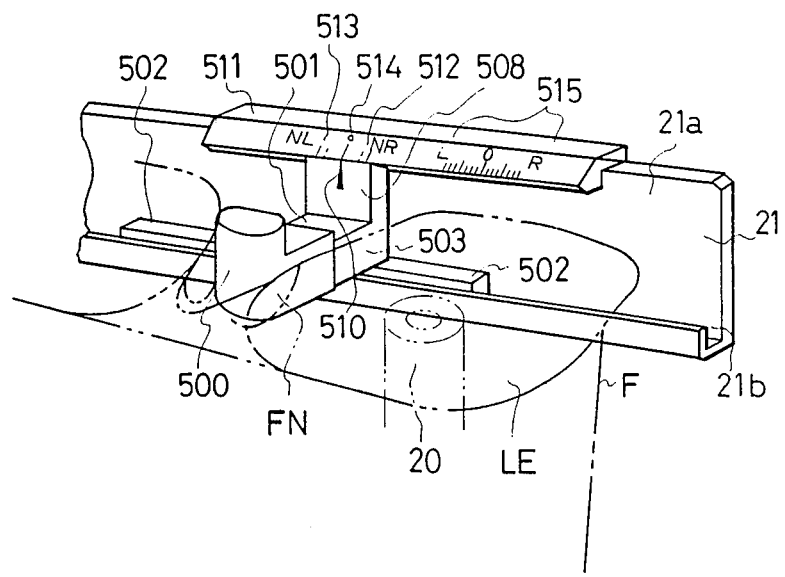
FIG. 17 is an external perspective view illustrating a nose-side movement amount displaying device according to a fourth embodiment of the present invention.
Figure 18:
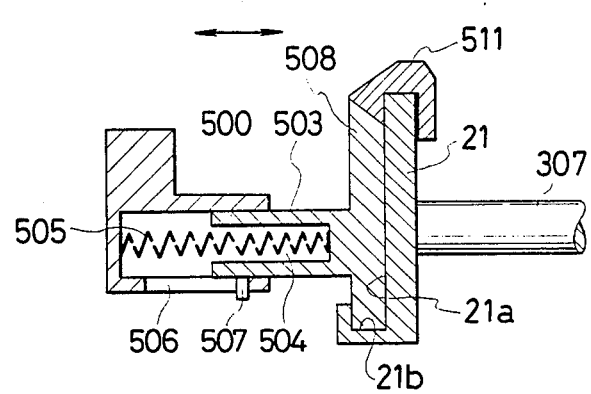
FIG. 18 is a vertical cross-sectional view thereof.

FIGS. 17 and 18 show an embodiment of the nose-side moving device for controlling the amount of movement of the lens being examined toward the nose side, which can be incorporated into the lens table 21 in the above-described first to third embodiments. A slider 501 having a nose pad holder 500 which is clamped by the nose pad FN of the eyeglasses frame F or a lens frame in the vicinity thereof is slidably mounted on the table surface 21a of the lens table 21. The slider 501 has an arm piece 502, which is inserted into a guide groove 21b formed in the lens table 21 and adapted to guide the movement of the slider 501.

The nose pad holder 500 is fitted into the supporting column 503 of the slider 501 such as to be movable in the axial direction of the supporting shaft and receives a force in the direction of moving away from the supporting column by means of the resilience of a spring 505 inserted into a hole 504 formed in the supporting column 503. A slot 506 is formed on the underside of the nose pad holder 500, into which a pin 507 embedded in the supporting column 503 is fitted so as to prevent the holder from coming off. The base plate 508 of the slider 501 is provided with an index line 510.

Meanwhile, a scale plate 511 is slidably installed on the side surface of the lens table 21. The nose-side movement amount indicators 512, 513, respectively indicating positions corresponding to the nose-side distance C of the near-distance refraction characteristics measuring portion 16 (refer to FIG. 1) of the progressive multifocal lenses of No. 1 and No. 2 market shares are provided to this scale plate 511 in such a manner as to be symmetrically about a division 514 as a center. Here, the "NR" mark of the indicator 512 denotes "the nose side of the right eye lens", while the "NL" mark of the indicator 513 denotes "the nose side of the left eye lens."

In addition, in this embodiment, a scale 515 is provided to display the amount of nose-side movement such as to be capable of coping with the measurement of any commercially available progressive multifocal lens. This scale 515 is provided with divisions such as to be transversely symmetrical about the division 0 as a center, and marks "R" and "L" are also provided to show whether they are divisions for the right eye lens or for the left eye lens.

Operation

Step 600 indicated by a long and two short dashes line in FIGS. 16A and 16B is executed as described below in place of the above-described Steps 113 to 116, or Steps 210 to 213. In other words, after completion of Step 112 or Step 209, the scale plate is first moved in such a manner that the 0 position indicator 514 (the division 0 if the scale 515 is to be used) of the scale plate 511 will be aligned with the index line 510 of the slider 501.

Next, since the lens being examined is a lens for the right eye in FIG. 17, the frame F is moved rightwardly on the table surface 21a. Since the nose pad FN of the frame F moves rightwardly accompanied with the nose pad holder, the slider 501 moves rightwardly on the table surface 21a. The measurer moves the frame F until the index line 510 is aligned with the indicator line of the nose-side movement indicator 513. In consequence, the near-distance refraction characteristics measuring portion is automatically made to agree with the measurement optical axis. When the scale 515 is used, the frame F may be moved by a portion of the nose-side distance C stated by the manufacturer of the lens being examined by the use of the division of the right eye "R"-side scale.

Fifth Embodiment

Arrangement

Figure 19:
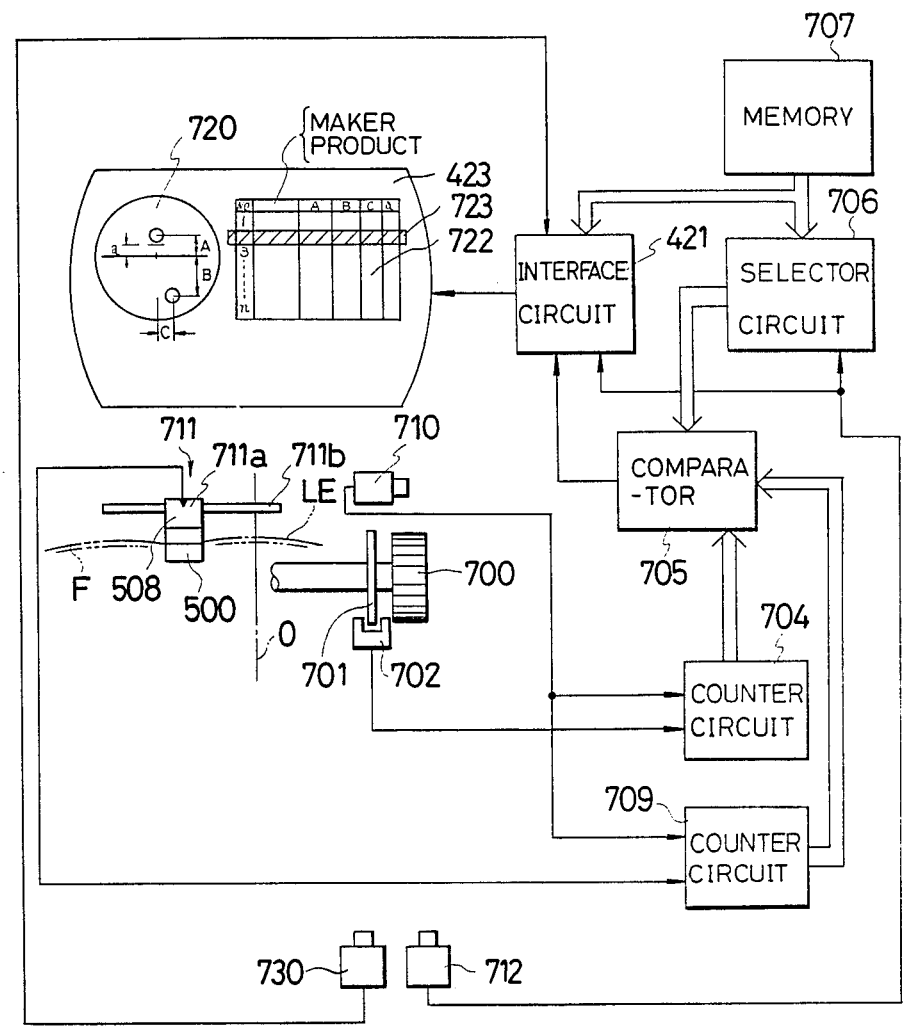
FIG. 19 is a block diagram illustrating a fifth embodiment according to the present invention.

FIG. 19 is a block diagram illustrating a fifth embodiment of the lens movement amount setting means of the present invention. The above-described first to fourth embodiments related to lens movement amount setting means each having a mechanical arrangement, whereas in this embodiment the means if electrically arranged. The arrangement of the lens meter body is the same as that of the third embodiment. In addition, the mechanical arrangement of the lens nose-side movement device is substantially the same as the fourth embodiment, but the base plate 508 is provided with an incremental encoder 711 having a detection head 711a and an electrically, magnetically, or optically arranged scale.

The amount of movement of the lens being examined in conjunction with the transverse movement of the eyeglasses frame F by the nose pad holder 500 is detected by the detection head, and counted by a counter circuit 709, and the result is inputted to a comparator 705.

On the other hand, an electrical, magnetic, or optical rotary encoder plate 701 is secured to the shaft 307 of a lever 700 for vertically moving the lens table so as to move the lens in conjunction with the vertical movement of the eyeglasses frame F. The amount of rotation of the shaft 307 is converted to the amount of rotation of the encoder plate 701, and the amount of rotation thereof is detected by a detection head 702 and is counted by a counter circuit 704, and the result is inputted to the comparator 705.

Of the data of the distances A, B, C, and a (refer to FIG. 1) of various types of progressive multifocal lenses which are stored in a memry 707 in advance, data on any of the lenses has been selected and inputted by a selector circuit 706. In addition, the data of distances of lenses stored in the memory circuit 707 are displayed on the CRT display 423 via the interface circuit 421, as illustrated in FIG. 19. The display on the CRT display 423 is constituted by the schematic drawing 720 of the lens, a distance data list 722 for various lenses, and an index 723 in which data are scanned for each line. Also, an arrow mark 724 indicating the moving direction of the lens and completion of the setting thereof is additionally displayed on the CRT picture shown in FIG. 13.

A selector switch 712 is connected to the interface circuit 421 and to a selector circuit 706, and the index 723 is made to scan the lines of indicated distance data for each lens of the indicator 722 while the the measurer keeps the selector switch 712 turned ON. If the ON operation of the selector switch is released by the measurer, the selector circuit 706, upon receipt of the instruction on release, operates to transmit the data on the distance of the lens at that time to the comparator 705. Meanwhile, an origin switch 710 is installed on the lens meter casing located above the lever 700. If this origin switch is turned ON, the switch operates such as to set the value counted by the counter circuit 704 to zero. In addition, a CRT picture changeover switch 730 is connected to the interface circuit 421.

Operation and Method of Lens Measurement

Figure 20:
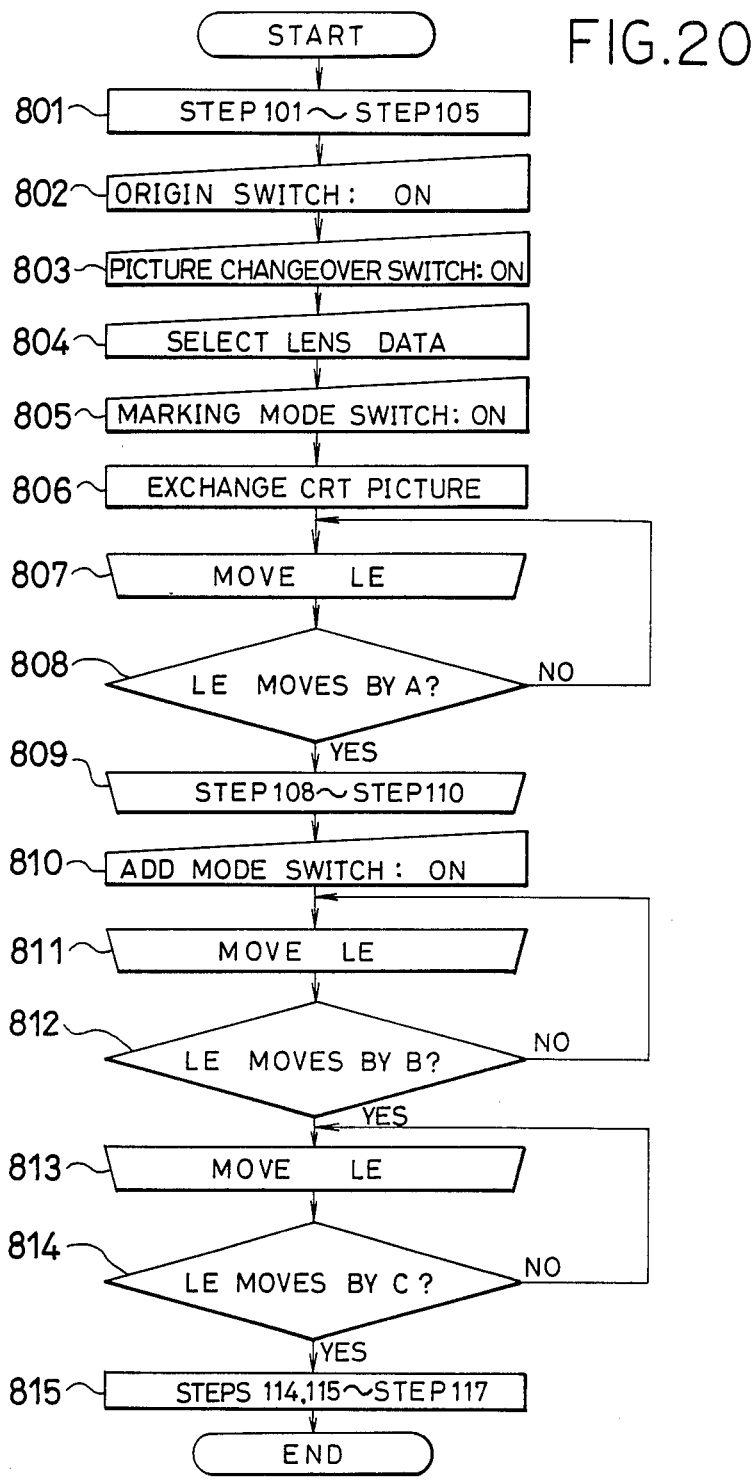
FIG. 20 is a flowchart explaining the operation of the fifth embodiment and a method of measurement based thereon.

FIG. 20 is a flowchart illustrating the operation of this embodiment and a method of measuring a lens on the basis thereof, and a detailed description thereof will be given below.

Step 801:

Execute the above-described Steps 101 to 105 of the third embodiment, and, if the optical center of the lens being examined or the lens being examined is a prism sealed product, the far-distance refraction characteristics measuring portion is made to agree with the measurement optical axis.

Step 802:

Turn ON the original switch 710. By the instruction of this switch 712, the counter ciruits 704, 709 reset the values counted up until now and supplied from the detection heads 702, 711b to zero.

Step 803:

Turn ON the CRT picture changeover switch 730. Consequently, the CRT display 423 changes over the picture illustrated in FIG. 13 to the picture shown in FIG. 20.

Step 804:

The measurer selects a lens to be examined using as reference the manufacturer's mark 17 (refer to FIG. 1) checked in advance, out of a table 722 in FIG. 19, moves the index 723 on the data display of the lens by means of an instruction of the selector switch 712, and makes index 723 to be supperposed on the lens data. If a lens data is selected, the selector circuit 706 transmits the data on the distance of the selected lens from the memory 707 to the comparator 705.

Step 805:

Turn ON the marking mode switch 431 (FIG. 13).

Step 806:

Upon receipt of the instruction of Step 805, the picture on the CRT display 423 is shifted to the picture shown in FIG. 13.

Step 807:

Move the lens being examined by rotating the lever 700 so that the far-distance portion thereof will agree with the measurement optical axis O. At this time, the detection head 702 detects the amount of rotation of the lever 700, i.e., the amount of movement of the lens, and the counter circuit 704 counts the amount. During the counting, as for the arrow mark 724 on the picture, an upper-side triangular arrow flickers, thereby indicating that the lens is moving in that direction.

Step 808:

The results counted by the counter circuit 704 are consecutively inputted into the comparator 705 as the amount of lens movement. The comparator circuit compares the data A of the selected data on distance inputted from the memory circuit 707 and the aforementioned amount of lens movement, and, if the amount of lens movement has become equal with the distance data A, the comparator 705 causes a circle mark in the middle of the arrow mark 724 on the CRT display to flicker, thereby indicating that the lens has moved by a predetermined distance, i.e., that the far-distance refraction characteristics measuring portion has been aligned with the measurement optical axis.

Step 809:

The above-described Steps 108 to 110 to measure the far-distance refraction characteristics, hold the results on the picture, and store the same in the memory 422.

Step 810:

Turn ON the ADD mode switch 433 (FIG. 13).

Step 811:

Move the lens toward the near-distance side by rotating the lever 700 in the opposite direction.

The amount of movement thereof is detected by the detection head 702 and counted by the counter circuit 704, and the counted value is inputted into the comparator. During the movement of this lens, the lower arrow of the arrow mark 724 on the picture flickers.

Step 812:

The comparator 705 compares a counted value supplied from the counter circuit with the selected distance data B, and, when the two have agreed with each other, the comparator 705 causes the circle mark in the middle of the picture to flicker.

Step 813:

Next, the measurer moves the eyeglasses frame F to the nose side on the table surface 21a of the table 21. The amount of the lens movement toward the nose side is detected by the detection head 711a, and the data is counted by the counter circuit 709. During the movement of the lens toward the nose side, the horizontal arrow of the arrow mark 724 on the picture in the case of FIG. 20 indicates that it is a lens for the right eye, so that the left arrow mark flickers.

Step 814:

The comparator compares the selected distance data C outputted from the memory circuit 707 with the counted values supplied from the counter circuit 709, and, when the two agree with each other, the comparator 705 causes the circle mark of the arrow mark 724 to flicker. Consequently, it becomes possible to tell that the near-distance refraction characteristics measuring portion has been aligned with the measurement optical axis.

Step 815:

Execute the above-described Steps 114, 115 to measure the refraction characteristics of the near-distance measuring portion, calculate the additional degree from a difference with the measured value for the far distance, hold the data on the picture, and causes the memory 422 to store the same.

The invention has thus been shown and described with reference to specific embodiments. However, it should be noted that the invention is in no way limited to the details of the illustrated arrangements but changes and modifications may be made without departing from the scope of the appended claims.

What is claimed:

1. A method of measuring, by the use of a lens meter, the refraction characteristics of a progressive multifocal lens to be examined, comprising:

a first step of optically aligning the optical center of the lens with a measurement optical axis of said lens meter;

a second step of moving the lens in such a manner that the far-distance refraction characteristics measuring portion of the lens will be aligned with said measurement optical axis by geographically moving said optical center by a predetermined distance of movement for the far-distance using said measurement optical axis as a point of origin;

a third step of measuring the far-distance refraction characteristics of the lens in said far-distance refraction characteristics measuring portion obtained in said second step;

a fourth step of moving the lens in such a manner that said optical center will be geographically moved by a predetermined distance of movement for near-distance using said measurement optical axis as a point of origin;

a fifth step of setting the near-distance refraction characteristics measuring portion of the lens so as to be aligned with said measurement optical axis in such manner that said optical center of the lens is geographically moved toward the nose side thereof by a predetermined amount of nose-side movement distance using the moved position obtained in said fourth step as a point of origin, or that the moved position obtained in said fourth step allows a maximum value to be obtained for an additional degree of the near distance calculated from a measured value at the time when said optical center of the lens is moved to the nose-side using the moved position obtained in said fourth step as a point of origin; and a sixth step of measuring the near-distance refraction characteristics of said near-distance refraction characteristics measuring portion set in said fifth step.

2. A method of measuring, by the use of a lens meter, the refraction characteristics of a progressive multifocal lens to be examined according to claim 1, wherein, in said first step, the lens is moved in such a manner that the pupil position refraction characteristics measuring portion of the lens will be aligned with said measurement optical axis by geographically moving said optical center of the lens by a predetermined distance of movement of the pupil position using said measurement optical axis as a point of origin after said optical center is aligned with said measurement axis, thereby measuring said pupil position refraction characteristics of the lens.

3. A method of measuring, by the use of a lens meter, the refraction characteristics of a progressive multifocal lens to be examined, comprising:

a first step of aligning the far-distance refraction characteristics measuring portion of the lens with a measurement optical axis of said lens meter by geographically moving the lens in such a manner that the absolute value of the degree of the spherical refractive power and/or the degree of the cylindrical refractive power of the far-distance portion of the lends will become minimum;

a second step of measuring the far-distance refraction characteristics of the lens in said far-distance refraction characteristics measuring portion obtained in said first step;

a third step of moving the lens by a predetermined distance of a geographically vertical movement up to the near-distance refraction characteristics measuring portion of the lens using the moved position obtained in said first step as a point of origin;

a fourth step of setting the near-distance refraction characteristics measuring portion of the lens so as to be aligned with said measurement optical axis in such a manner that said optical center of the lens is geographically moved toward the nose side thereof by a predetermined amount of nose-side movement using the moved position obtained in said third step as a point of origin, or that the moved position obtained in said third step allows a maximum value to be obtained for an additional degree of the near distance calculated from a measured value at the time when said optical center is moved toward the nose side using the moved position obtained in said third step as a point of origin; and a fifth step of measuring the near-distance refraction characteristics of said near-distance refraction characteristics measuring portion set in said fourth step.

4. A lens meter for measuring the refraction characteristics of a progressive multifocal lens to be examined having a lens mounting means for mounting the lens fitted into an eyeglasses frame, a measuring means for measuring the refraction characteristics of the lens, a lens table having a table surface for abutting the lens frame of the eyeglasses frame and for restricting the vertical position of the lens within a plane substantially vertical to the optical axis of said measuring means, and a lens table moving means for moving said lens table in such a manner as to change an interval between said table surface and said optical axis, characterized in that said lens meter has a vertical movement amount setting means for setting an amount of said vertical movement of the lens, and said lens vertical movement amount setting means is arranged such that its point of origin can be changed independently from the movement of said lens table.

5. A lens meter according to claim 4, wherein said lens table moving means has a handle pivotally supported by a body of said lens meter such as to be rotatable, and said lens vertical movement amount setting means is engaged concentrically with the rotary shaft of said handle so as to be rotatable with a desired frictional force and is constituted by a setting ring having an indicator portion on the external surface thereof for indicating a set amount of movement of the lens as well as an index means secured to said body in the vicinity of said setting ring.

6. A lens meter according to claim 4, wherein said lens vertical movement amount setting means is secured to said body within a plane parallel with said vertical plane such as to be vertically movable and is constituted by a setting plate having an indicator for indicating a set amount of movement of the lens and an index means secured to said lens table.

7. A lens meter according to claim 5, wherein said setting ring is provided with the following indicators: an optical center position indicator for indicating that the optical center or geographic center of a particular lens to be examined within said lens frame restricted by said lens table agrees with said optical axis, a far-distance measuring portion position indicator for indicating that the far-distance refraction characteristics measuring portion of said restricted lens is aligned with said optical axis, and a near-distance measuring portion position indicator for indicating that the near-distance refraction characteristics measuring portion of said restricted lens is aligned with said optical axis.

8. A lens meter according to claim 7, wherein said setting ring is further provided with a fitting point position indicator for indicating that the fitting point of said particular lens is aligned with said optical axis.

9. A lens meter according to claim 5, wherein said setting ring is further provided with an optical center position indicator for indicating that the optical center or geographic center of a nonspecified lens to be examined within said lens frame restricted by said lens table is aligned with said optical axis of said measuring means when said lens table is moved in accordance with said indicator, a far-distance scale for indicating a set amount of geographic movement of said nonrestricted lens toward the far-distance-portion side thereof using said optical center position indicator as a point of origin, and a near-distance scale for indicating a set amount of geographic movement of said nonrestricted lens towrad the near-distance-portion side thereof using said optical center indicator as a point of origin.

10. A lens meter according to claim 4, wherein said lens table is made to abut the nose pad of said eyeglasses frame or lens frame in the vicinity thereof, and has a nose-side movement means supported for movement in parallel with said lens table surface so as to move said eyeglasses frame toward the nose side thereof and a lens nose-side movement amount setting means for setting an amount of movement of said lens nose-side movement means, said lens nose-side movement amount setting means being constituted by a nose-side index provided on said lens nose-side movement means and a nose-side movement amount indicator provided on said lens table in parallel with the moving direction of said lens nose-side movement means.

11. A lens meter according to claim 4, wherein said lens vertical movement amount setting means is constituted by a detecting means for electrically detecting the amount of movement of said lens table itself or said movement means thereof, a memory means for storing a predetermined amount of lens movement, and a comparing means for comparing an output of the detection of said detecting means and said amount of lens movement stored in said memory means.

12. A lens meter according to claim 6, wherein said setting plate is provided with the following indicators: an optical center position indicator for indicating that the optical center or geographic center of a particular lens to be examined within said lens frame restricted by said lens table agrees with said optical axis, a far-distance measuring portion position indicator for indicating that the far-distance refraction characteristics measuring portion of said restricted lens is aligned with said optical axis, and a near-distance measuring portion position indicator for indicating that the near-distance refraction characteristics measuring portion of said restricted lens is aligned with said optical axis.

13. A lens meter according to claim 12, wherein said setting plate is further provided with a fitting point position indicator for indicating that the fitting point of said particular lens is aligned with said optical axis.

14. A lens meter according to claim 6, wherein said setting plate is further provided with an optical center position indicator for indicating that the optical center or geographic center of a nonspecified lens to be examined within said lens frame restricted said lens table is aligned with said optical axis of said measuring means when said lens table is moved in accordance with said indicator, a far-distance scale for indicating a set amount of geographic movement of said nonrestricted lens toward the far-distance-portion side thereof using said optical center position indicator as a point of origin, and a near-distance scale for indicating a set amount of geographic movement of said nonrestricted lens toward the near-distance-portion side thereof using said optical indicator as a point of origin.

* * * * *